US008289306B2

(12) United States Patent
Unger

(10) Patent No.: US 8,289,306 B2
(45) Date of Patent: Oct. 16, 2012

(54) STATIC RETENTION MODE FOR DISPLAY PANELS

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 920 days.

(21) Appl. No.: 12/215,616

(22) Filed: Jun. 27, 2008

(65) Prior Publication Data

US 2009/0322969 A1 Dec. 31, 2009

(51) Int. Cl.

| | |
|---|---|
| ***G09G 5/00*** | (2006.01) |
| ***G09G 3/36*** | (2006.01) |
| ***H04N 7/14*** | (2006.01) |
| ***H04N 5/225*** | (2006.01) |
| ***H04N 5/44*** | (2011.01) |

(52) U.S. Cl. .... 345/211; 345/98; 348/14.01; 348/220.1; 348/559

(58) Field of Classification Search .................. 345/211
See application file for complete search history.

(56) References Cited

U.S. PATENT DOCUMENTS

| | | | | |
|---|---|---|---|---|
| 5,625,412 | A * | 4/1997 | Aciu et al. | 348/222.1 |
| 5,745,093 | A | 4/1998 | Tsuzuki et al. | |
| 7,068,251 | B2 | 6/2006 | Lin et al. | |
| 7,180,496 | B2 | 2/2007 | Koyama et al. | |
| 7,184,014 | B2 | 2/2007 | Koyama et al. | |
| 7,224,339 | B2 | 5/2007 | Koyama et al. | |
| 7,259,758 | B2 | 8/2007 | Yee | |
| 2002/0021274 | A1* | 2/2002 | Koyama et al. | 345/98 |
| 2002/0021295 | A1* | 2/2002 | Koyama et al. | 345/205 |
| 2003/0016201 | A1* | 1/2003 | Ayres et al. | 345/98 |
| 2004/0252759 | A1* | 12/2004 | John Winder et al. | 375/240.12 |

* cited by examiner

*Primary Examiner* — Alexander S Beck
*Assistant Examiner* — Kirk Hermann
(74) *Attorney, Agent, or Firm* — Miller Patent Services; Jerry A. Miller

(57) ABSTRACT

A video display method consistent with certain embodiments involves sampling video from a video source using a sample and hold frame buffer such that frames are received and stored as the frames of video information are supplied from the video source at a refresh interval to a video display panel in a dynamic mode of operation wherein the screen is refreshed with a new frame of video data at each refresh interval; determining that a static mode of operation is to be entered; sending an output signal from the sample and hold frame buffer to the video display panel during the static mode of operation; and placing the video source in a lower power consumption mode in the static mode of operation. This abstract is not to be considered limiting, since other embodiments may deviate from the features described in this abstract.

19 Claims, 5 Drawing Sheets

STATIC RETENTION MODE FOR DISPLAY PANELS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Display panels are usually designed to support a sequence of rapidly changing images which the user sees as motion video. In some applications the image displayed is static for long periods of time. Traditionally this is accomplished by sending the same image repeatedly to the display. Continuous refresh means that the source device, such as a graphics processor chip for example, must be continuously powered and consuming energy.

Many arrangements are possible for display panels. FIG. 1 shows a conventional liquid crystal display (LCD) panel 10 and associated circuit arrangement. The display panel has a timing controller (T-Con) 20 that receives differential signals such as low voltage differential signaling (LVDS) or any other suitable signaling at 25 as received from a video source such as a graphics chip 28. The T-Con is often considered a part of the display panel assembly 10 and will be treated as such throughout this document, but it will be understood that the T-Con may in fact be realized in a separate circuit assembly that is not physically attached to the panel. Output signals are provided in a matrix arrangement to a plurality of drivers 32 and 36 shown as horizontal drivers and vertical drivers respectively for driving pixels of the display panel 42. A particular pixel can be selected to be driven to a particular brightness (or transmissivity). By addressing the pixel according to its horizontal and vertical location in the panel and applying a suitable signal thereto. Conventionally multiple such pixels (e.g., three or six) are illuminated simultaneously to produce a point in an image having a particular color, and brightness characteristics. Such points in an image are commonly also called "pixels", but for purposes of this document, the term will generally be used to reference any of the single pixels used to form a point in an image. Other panel arrangements are also possible, and embodiments consistent with the present invention are equally applicable to such arrangements.

LCD Display panels such as 42 are inherently inefficient in transmission of light. The LCD's control circuitry (T-Con 20 in conjunction with H-driver 32 and V-diver 36) is used to control the transmissivity of the LCD pixels so that light produced by a backlighting light source is controlled in color intensity. However, the amount of light that passes through the pixel is limited to around 3-5% of the light intensity of the backlight. Transistors and other circuit elements are often fabricated on the LCD panel itself adjacent the pixel, e.g., the pixel's driving transistors and voltage holding capacitor. However, any such circuitry including light sensitive elements is coated with light impervious material to eliminate or reduce photoelectric responses of those devices themselves. Thus, such circuitry appearing directly on the LCD panel itself is preferably minimized since its presence further reduces the efficiency of light transmissivity and furthermore affects the density of pixels that can be displayed on a given panel.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
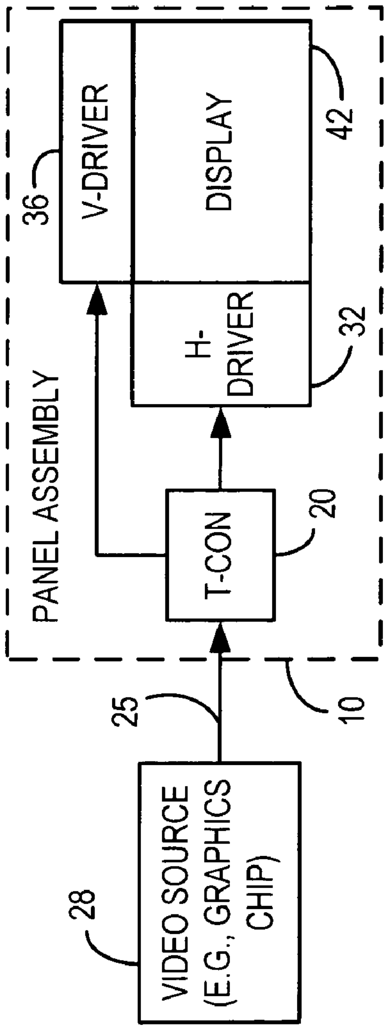
FIG. 1 (PRIOR ART)
FIG. 1 is a block diagram of a conventional panel assembly.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a serviet, a source code, an object code, a shared library/dynamic load library and/or other sequence of instructions designed for execution on a computer system having one or more processors.

In accord with certain embodiments consistent with the present invention, a method to freeze a display image using the display pixels themselves or a sample-and-hold frame buffer as the raster memory device is provided.

As previously noted, display panels are usually designed to support a sequence of rapidly changing images which the user sees as motion video. In some applications the image displayed is static for long periods of time. Traditionally this is accomplished by sending the same image repeatedly to the display. Continuous refresh means that the source device, such as a graphics processor chip for example, must be continuously powered and consuming energy. It is also noted that it is desirable to present an image as soon as possible after pressing the “on” button but this is usually thwarted by long boot cycles of image sources.

A conventional LCD panel has a capacitor associated with each pixel. A control voltage is supplied to each successive capacitor with each pixel clock. The magnitude of the voltage determines the light transmissivity for that pixel. Because the value retained by the capacitor decays over time, voltage is again applied as part of painting the next frame. Transistors are used to gate the appropriate voltage to the capacitor. The static image could be retained by adding a sample-and-hold circuit around the capacitor. This permits the energy to be periodically applied to rewrite the value and mitigate the pixel’s decay. However, doing so has the disadvantage of reducing the brightness of the panel and limiting the pixel density of the panel. Each transistor or other element that is added at the pixel site has the effect of reducing the transmissivity of the panel. While the impact might be relatively low for low resolution displays with low pixel density, large pixels and only a few bits of resolution, high definition displays with higher pixel density and high color and brightness resolution (e.g., ten or twelve or more bits) is wholly impractical since the transmissivity of the panel would be seriously degraded.

In accord with certain embodiments consistent with the present invention, a sample-and-hold (S/H) frame buffer circuit can be used without changes to the fundamental LCD panel and also work for other panel technologies (e.g. OLED) to permit static images to be displayed without need to constantly refresh the display. This alternative uses a sample-and-hold frame buffer inline with the normal pixel flow. During normal operation, pixel data is written (“sampled”) to the frame buffer while simultaneously changing the pixels on the screen to effect dynamic screen operation (i.e., operation wherein the image is moving). In a static mode of operation, data (on “hold”) in the frame buffer can be used to refresh the pixels. The refresh rate for static operation would only need to overcome pixel decay and could be reduced to improve energy efficiency. In this manner, a static mode of operation can be achieved at reduced power consumption for purposes of using the LCD or other applicable display panel as a display for artwork or photographs. Or, a splash screen or other image (e.g., the most recently displayed image) can be stored when the display is powered down, and then near immediately displayed upon powering on the display, thereby creating an “instant-on” effect to reassure the user of the proper operational status of the display. Low power retention of image frames also provides the ability to power up to normal while a startup wallpaper image is displayed instantaneously. Pressing the power on button would evoke a visual response within milliseconds.

In certain embodiments, the sample-and-hold solution can support a variation with storage for multiple frames, for example in response to a “snapshot” command that stores a snapshot of the current video frame. The economics of memory pricing can be used to determine retention of multiple frames with little if any increase in cost. This means that multiple frames could be retained and addressed for selective display.

Figure 2:
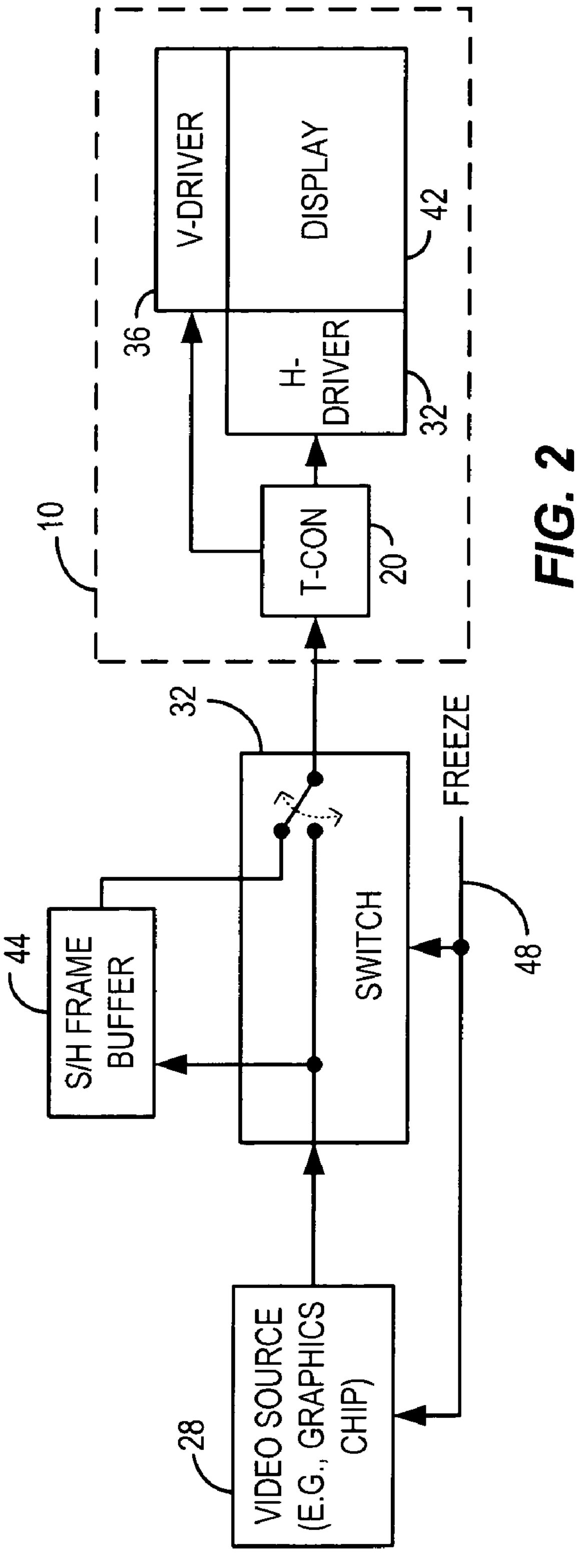
FIG. 2 is a block diagram of a panel assembly and associated sample and hold (S/H) frame buffer circuitry consistent with certain embodiments of the present invention.

Turning now to FIG. 2, an example embodiment is depicted in block diagram form wherein the same panel assembly 10 can be utilized without modification to achieve a lower power static display mode of operation, thereby taking advantage of existing panel technology without modification, and thus, capitalizing on economies of scale. In this embodiment, video from video source 28 passes through a switch 32 which passes the video from video source 28 (e.g., a graphics chip, tuner, or the like) to the display panel 10 during normal display of video in a dynamic mode, such as normal television or video viewing modes of operation. During this mode of operation, a sample and hold frame buffer 44 also receives frames of video from the video source. At each refresh interval for the video frame, the S/H frame buffer 44 samples the frame and stores the frame for potential later use. In one embodiment, the S/H frame buffer 44 stores only the most recent frame of video. In other embodiments, the S/H frame buffer 44 can hold multiple frames of video, for example selected at a specified interval of time (e.g., every five seconds or every ten minutes, or every time the frame refreshes). In other embodiments, the location for multiple frames could also be addressable via control signals.

When the system enters a static mode (or freeze frame—like mode of operation), a freeze command is received either by virtue of a manual input, pre-configuration, power-on of the system or any other suitable mechanism, a freeze signal 48 causes the switch 32 to switch to a static mode in which the video frame stored in the S/H frame buffer 44 is passed to the display panel 10 and displayed. Freeze signal 48 also causes the video source 28 to enter a lower power mode of operation (an idle, standby, or sleep state or even a fully powered down off state). This static mode can be entered by user command (e.g., a freeze frame or pause operation), or can be an initial state of power-up of the display device wherein a frame stored in S/H frame buffer 44 is displayed immediately at power-up. The freeze mode can also be initiated to place the display in a “picture frame” mode to produce images for decoration either from the video source 28 or another source as will be described later. Hence, static images can be displayed without need for a video source to continually operate and refresh a static image.

Figure 3:
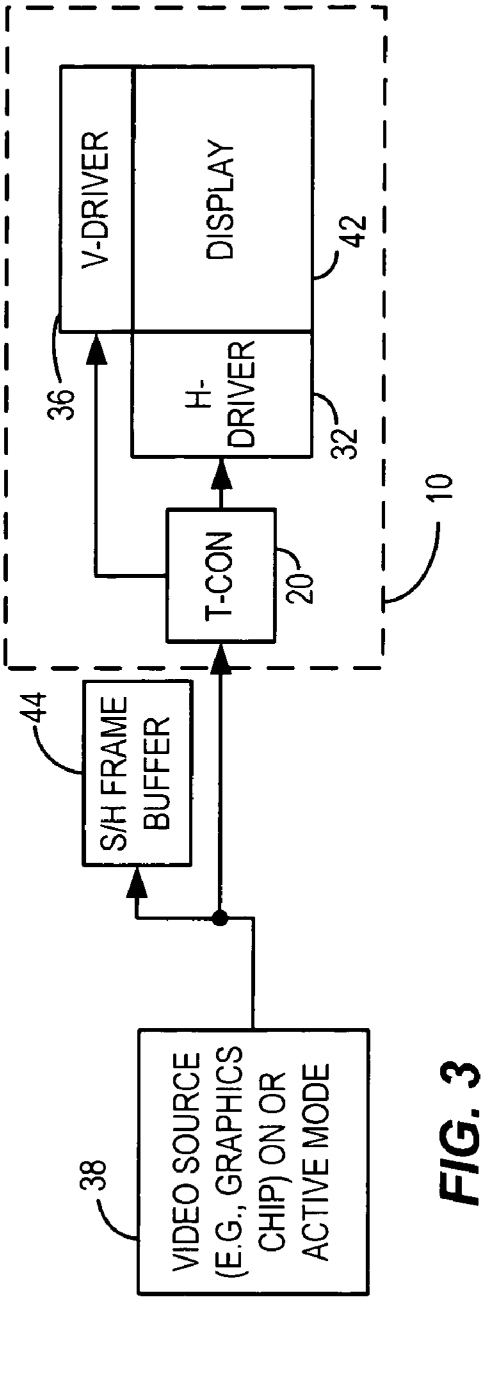
FIG. 3 is a block diagram of a panel assembly and associated sample and hold (S/H) frame buffer circuitry operating in a dynamic mode of operation consistent with certain embodiments of the present invention.

FIG. 3 depicts the operation of the system of FIG. 2 in the dynamic mode of operation wherein the video signal is being received from the video source 38, as in the case of normal television display mode. In this case, the S/H frame buffer 44 is sampling the output of the video source 38 as video is being supplied to the display panel assembly 10. In this illustration, the switch 32 is omitted to show the connections that the switch would make in a more readily understood manner. It is appropriate to note that while the illustrated display panel 10 incorporates the elements of an LCD display, the present invention is not limited to such display, but an LCD display is used as an illustrative example that can be replaced with any suitable display without departing from embodiments consistent with the present invention.

Figure 4:
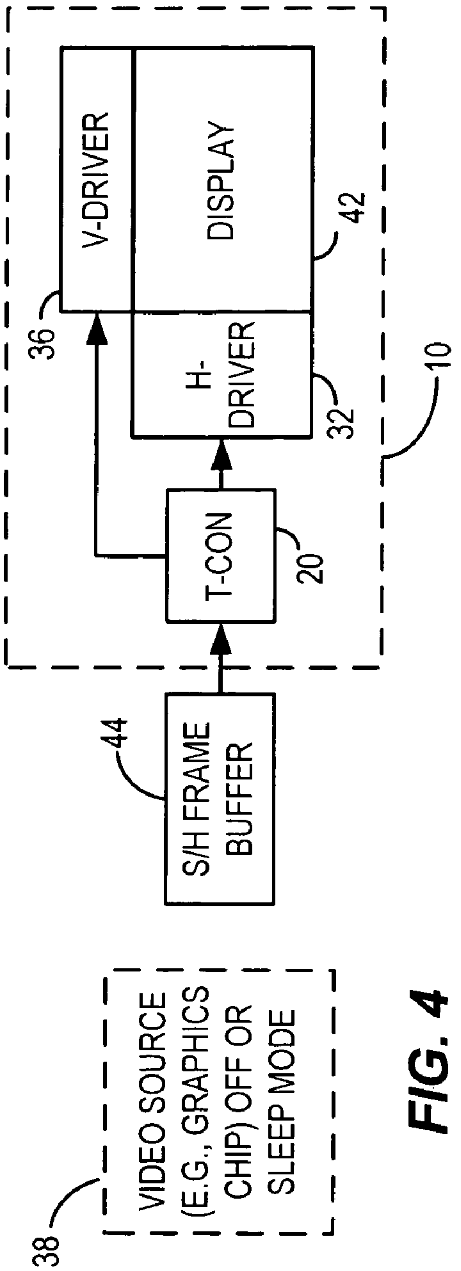
FIG. 4 is a block diagram of a panel assembly and associated sample and hold (S/H) frame buffer circuitry operating in a static mode of operation consistent with certain embodiments of the present invention.

When a freeze signal 48 is activated by any suitable mechanism (including power-up of the system or a freeze frame or pause command), the system enters the static mode of operation in order to conserve power. FIG. 4 depicts the operation of the system of FIG. 2 in the static mode of operation wherein the video signal is being received from the S/H frame buffer 44, as in the case of normal television display mode. In this case, the S/H frame buffer 44 is outputting its stored video frame as video to the display panel assembly 10 at a suitable refresh rate to permit the video frame to remain displayed in a continuously refreshed manner as a static image on the display panel 10. In this illustration, again the switch 32 is omitted to show the connections that the switch would make in a more readily understood manner. Video source 38 is shown in dashed lines to indicate that it is in a lower power sleep or standby or idle mode or off.

Figure 5:
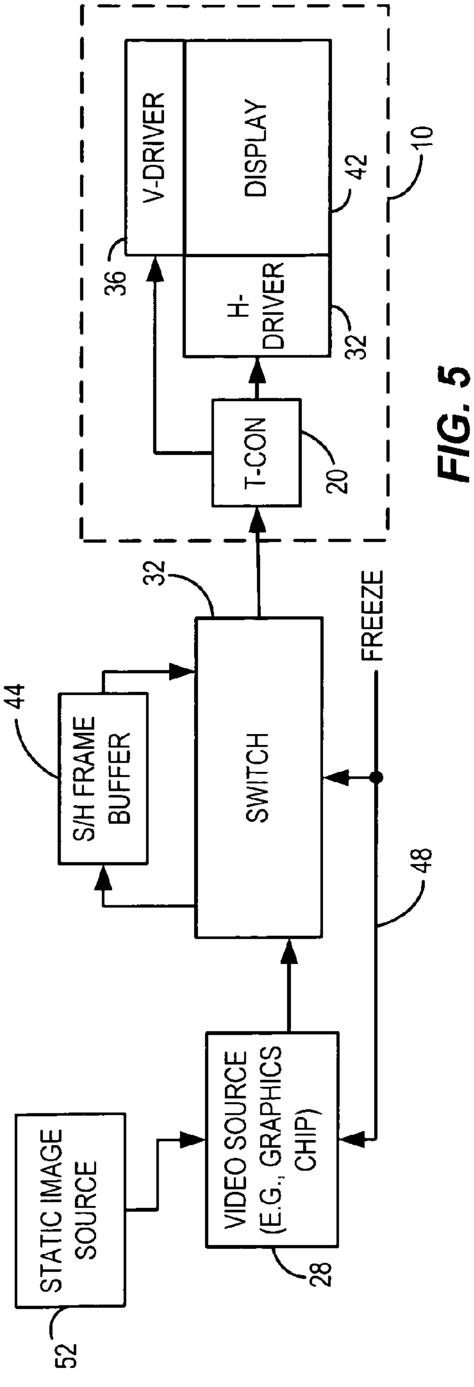
FIG. 5 is a block diagram of a panel assembly and associated sample and hold (S/H) frame buffer circuitry including a static image source consistent with certain embodiments of the present invention.

In accordance with another embodiment consistent with the present invention as depicted in FIG. 5, switch 32, and controlling signals therefor, can be modified from that previously presented so that on receipt of a suitable command, an image stored in a static image source 52 (e.g., a flash memory, non-volatile memory or disc drive) can be presented through video source 28 and switch 32 to the S/H frame buffer 44 and on to the display panel 10. In this embodiment, the static image source 52 can, for example, contain a user defined or manufacturer stored splash screen that is depicted upon power-up of the display to provide a near instant-on experience. In other embodiments, photographic images (e.g., stored as jpg files) can be converted to frames of video for delivery to the S/H frame buffer 44 for display as artwork or a user configurable photograph to be displayed as a static image on the display panel 10. Such static images can remain static or changed in a slide-show type format wherein one from a collection of images is displayed sequentially in a defined or random or pseudorandom order. In addition, frames of video from the video source 28 can be continually captured by the S/H frame buffer during dynamic video mode for freeze frame operation.

Figure 6:
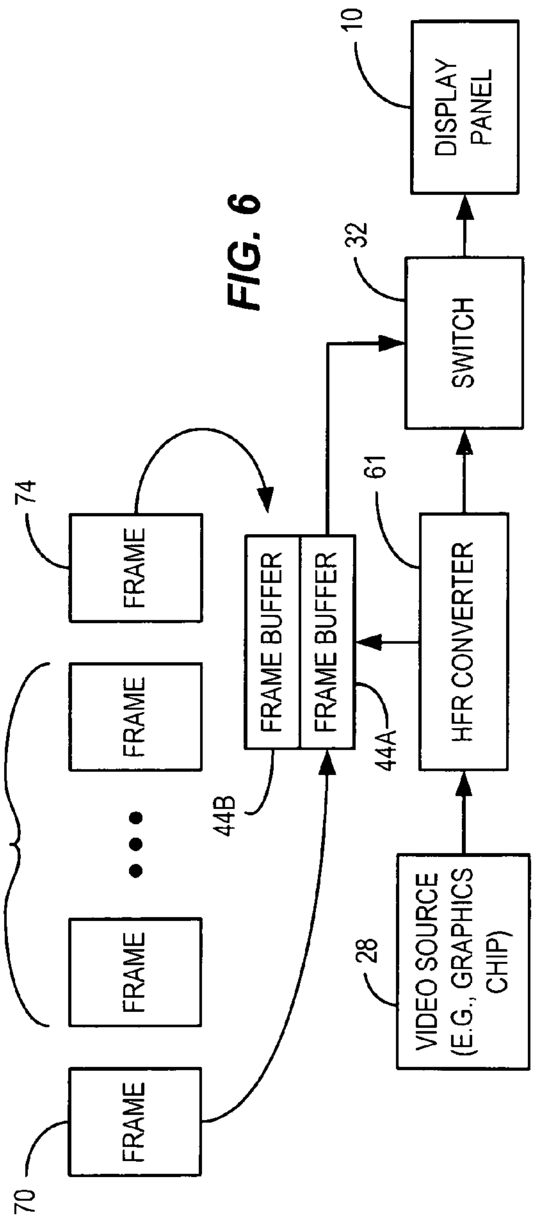
FIG. 6 is a block diagram illustrating operation in certain embodiments incorporating a high frame rate converter in a manner consistent with certain embodiments of the present invention.

In many video display systems, high frame rates are used to improve dynamic image display performance. Embodiments consistent with the present invention can be utilized in conjunction with such systems in a number of ways. In production of many video streams, the original video is captured and possibly mastered at 24 frames per second. However, to improve video presentation, this frame rate is often refreshed on a video screen at 61 or 120 frames per second or even higher (e.g., 240 fps). This provides improvement in hiding artifacts of motion when the image is digitized. FIG. 6 depicts an example consistent with certain embodiments wherein a high frame rate (HFR) converter 61 is used to produce synthesized intermediate frames 66 from a pair of adjacent actual original frames 70 and 74. In this example, the S/H frame buffer is a multi-frame buffer storing two frames (but this should not be considered limiting since potentially many frames can be stored). In this example, actual original video frames (un-synthesized frames) 70 and 74 are stored in frame buffer segment 44A and 44B respectively, with the synthesized intermediate frames 66 ignored. In other embodiments, no distinction is made between synthesized and un-synthesized frames. The frames can be received by the frame buffer 44 from the video source 28 or from the HFR converter 61 as shown. In accord with certain embodiments, the HFR and S/H frame buffer can operate more in parallel rather than serial. In certain embodiments, the HFR and S/H frame buffer can also share the same memory element for frame storage. Other embodiments will occur to those skilled in the art.

In each of the above example embodiments, by powering down the video source during a static mode of operation, a substantial percentage of the power consumed by the overall video display device can be eliminated thereby reducing energy consumption and heat generation.

Figure 7:
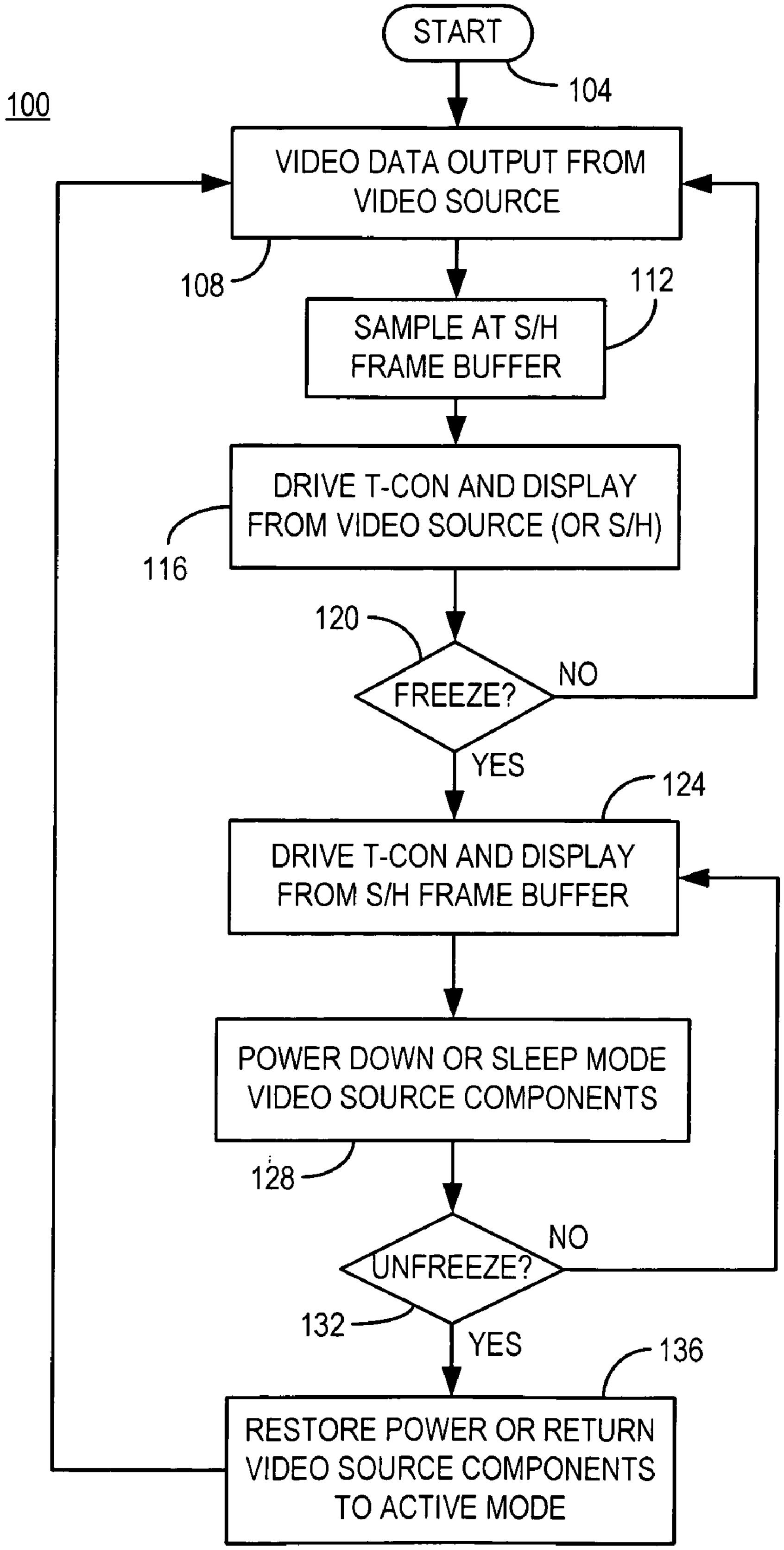
FIG. 7 is a flow chart depicting operation of one example process consistent with certain embodiments of the present invention.

FIG. 7 depicts a generalized flow chart 100 starting at 104 depicting the general process carried out in accordance with certain embodiments consistent with the invention. At 108, video data output are output from the video source and such video data are sampled at 112 at the S/H frame buffer 44 (either directly or through a HFR converter). At this point, this illustrative diagram assumes that the system is in dynamic display mode and the T-Con and display panel are driven from the video display source at 116. If the system is placed in freeze mode at 120 (i.e., static display mode or pause mode), the T-Con and display panel are driven from the S/H frame buffer at 124. It is noted that the frame buffer may be designated to display either the frames stored during dynamic operation, or from a separate source of static images as previously described. If freeze mode is not selected, video continues to flow from the video source at 108.

At 128, the video source can be powered down or placed in a sleep, standby or idle mode to reduce power consumption until the mode is switched from the frozen static mode to the dynamic mode at 132. Hence, as long as the system is in static mode, control loops from 132 to 124 to 128 and back to 132. When the unfreeze command is received to place the system in dynamic display mode at 132, power is restored to the video source and control returns to 108.

Figure 8:
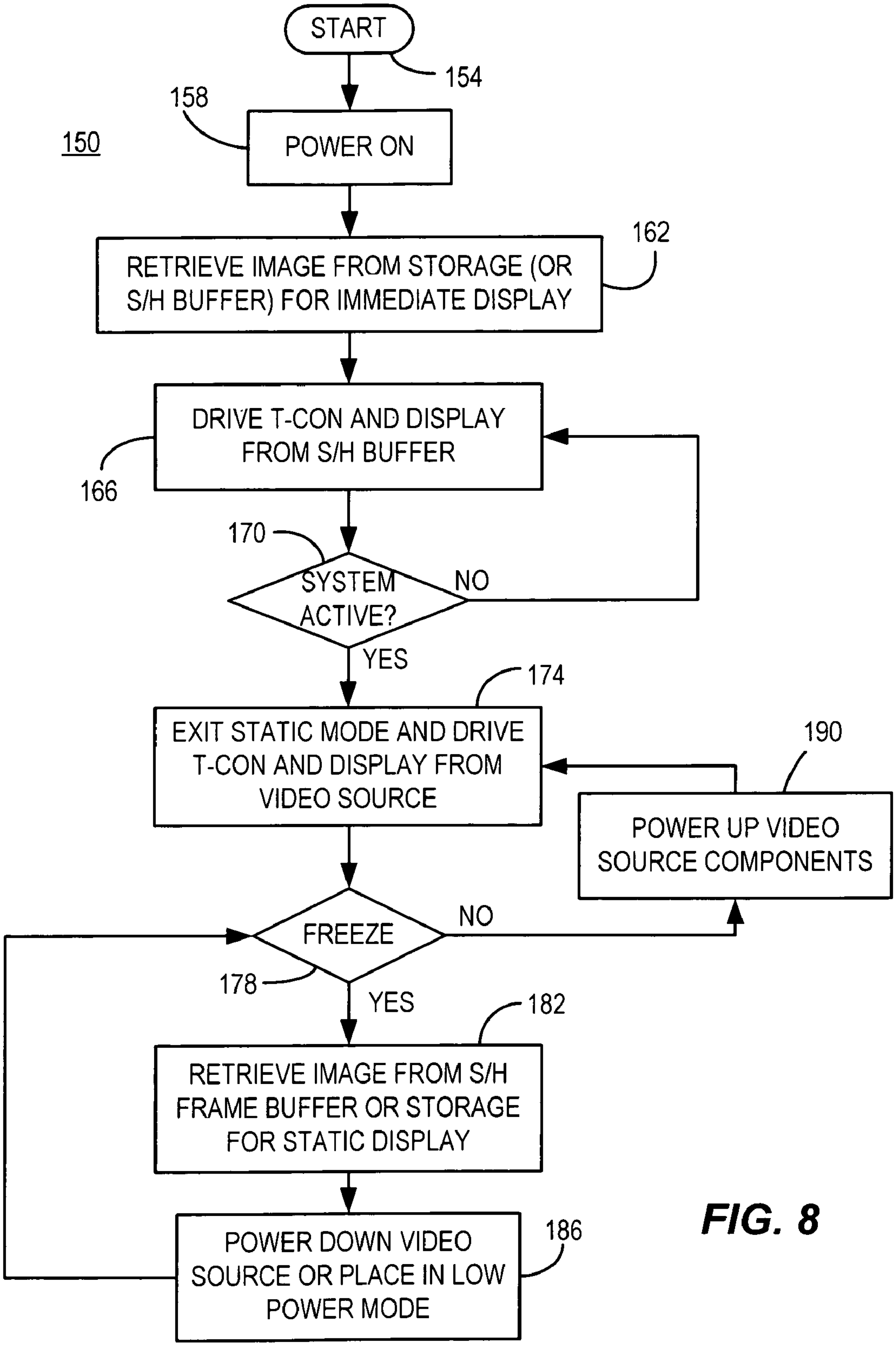
FIG. 8 is a flow chart depicting another mode of operation of one example process consistent with certain embodiments of the present invention.

FIG. 7 depicts a simple mode of operation starting with dynamic mode and switching on command to static mode. But, as described earlier, by reconfiguration of this process, the process can start at static mode displaying any selected video frame (last frame before power down, splash screen image from separate storage, slide show, static user defined image, photograph, etc.). One example of such a process 150 is depicted in FIG. 8. In this process, starting at 154, the video display system is powered on at 158. Upon powering on, an image is retrieved from storage and applied to the S/H buffer memory or S/H buffer memory 44 (or retrieved directly from the S/H buffer memory) at 162. This image is immediately sent to the T-Con and display panel (in the case of an LCD display) by the S/H buffer memory 44 at 166. This image, e.g., a splash screen, last frame stored in the S/H buffer memory, user selected image, etc., is available for viewing almost immediately to provide an instant-on experience. This image persists as a static image until such time as the system is deemed booted and fully active at 170.

Once the system has booted and is ready to display dynamic images at 170, the static mode is exited at 174 and the T-Con and display panel are driven by the video source. This operation persists until a freeze mode is entered at 178 by virtue of any user or programmed action at which point the freeze mode starts at 182 by retrieving a selected image from the S/H buffer memory or from storage for static images at 182 and the static image is displayed. While static image is being displayed, the video source may powered down (removing supply power) or enter a lower power state at 186 to conserve energy until such time as the freeze mode is exited at 178. When this occurs, the video source components are powered up at 190 and control passes back to 174 where dynamic mode display resumes.

Many variations will occur to those skilled in the art upon consideration of the present teachings. In certain embodiments, it will be appreciated that the size of the S/H frame buffer will permit only a specified number of frames to be stored. When this limit is reached, the earliest stored frame is lost in favor of a newer frame.

Thus, a video display arrangement consistent with certain embodiments has a video display panel and a video source. A sample and hold frame buffer receives and stores frames of video information as the frames of video information are supplied from the video source at a refresh interval to the video display panel in a dynamic mode of operation wherein the screen is refreshed with a new frame of video data at each refresh interval. The sample and hold frame buffer stores a most recent new frame of video at each refresh interval. A switch receives an output of the sample and hold frame buffer and the output of the video source, the switch being operative to divert the output of the sample and hold frame buffer to the display panel in place of the frames of video from the video source in a static mode of operation. The video source is placed in a lower power consumption mode in the static mode of operation.

In certain embodiments, the video source is placed in a lower power consumption mode by removing supply power to the video source. In certain embodiments, the static mode of operation is entered in response to a user command. In certain embodiments, the static mode of operation is entered as a consequence of a user command to enter standby mode. In certain embodiments, the static mode is entered upon powering up the video display arrangement and wherein the switch switches to the dynamic mode after the video display arrangement is booted up. In certain embodiments, multiple frames are stored in the sample and hold frame buffer. In certain embodiments, the multiple frames are stored at specified time intervals. In certain embodiments, the multiple frames are stored in response to a snapshot trigger signal. In certain embodiments, the sample and hold frame buffer receives data representing a static image from a storage device that stores a static image. In certain embodiments, a high frame rate converter is provided, and the sample and hold frame buffer receives frames of video data from the high frame rate converter. In certain embodiments, the frames of data received by the sample and hold frame buffer comprise only un-synthesized frames.

In another exemplary implementation, a video display arrangement has a video display panel and a video source and a static image storage device. A sample and hold frame buffer receives and stores multiple frames of video information as the frames of video information are supplied from the video source at a refresh interval to the video display panel in a dynamic mode of operation wherein the screen is refreshed with a new frame of video data at each refresh interval. The sample and hold frame buffer selectively receives data from the static inage storage device. The sample and hold frame buffer stores a most recent new frame of video at each refresh interval. A switch receives an output of the sample and hold frame buffer and the output of the video source, the switch being operative to divert the output of the sample and hold frame buffer to the display panel in place of the frames of video from the video source in a static mode of operation. The static mode of operation is entered in response to a user command. The static mode is entered upon powering up the video display arrangement and wherein the switch switches to the dynamic mode after the video display arrangement is booted up. The sample and hold frame buffer selectively receives data representing a static image from the video source or from the static image storage device. The video source is placed in a lower power consumption mode in the static mode of operation.

In certain embodiments, the video source is placed in a lower power consumption mode by removing supply power to the video source. In certain embodiments, the multiple frames are stored at specified time intervals. In certain embodiments, a high frame rate converter is provided, wherein the sample and hold frame buffer receives frames of video from the video source via the high frame rate converter. In certain embodiments, the frames of data received by the sample and hold frame buffer comprise only un-synthesized frames.

An exemplary video display method involves sampling video from a video source using a sample and hold frame buffer such that frames are received and stored as the frames of video information are supplied from the video source at a refresh interval to a video display panel in a dynamic mode of operation wherein the screen is refreshed with a new frame of video data at each refresh interval; determining that a static mode of operation is to be entered; sending an output signal from the sample and hold frame buffer to the video display panel during the static mode of operation; and placing the video source in a lower power consumption mode in the static mode of operation.

In certain embodiments, the video source is placed in a lower power consumption mode by removing supply power to the video source. In certain embodiments, the static mode of operation is entered in response to a user command. In certain embodiments, the static mode is entered upon powering up a video display system and wherein a switch switches to the dynamic mode of operation after the video display system is booted up. In certain embodiments, multiple frames are stored in the sample and hold frame buffer. In certain embodiments, the multiple frames are stored at specified time intervals. In certain embodiments, the sample and hold frame buffer receives data representing a static image from a storage device that stores a static image. In certain embodiments, the sample and hold frame buffer receives frames of video data from a high frame rate converter. In certain embodiments, the frames of data received by the sample and hold frame buffer comprise only un-synthesized frames.

Those skilled in the art will recognize, upon consideration of the above teachings, that certain of the above exemplary embodiments are based upon use of one or more programmed processors to control entry into the static mode or dynamic mode. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits, dedicated hard wired logic and combinations thereof may be used to construct alternative equivalent embodiments. Error trapping can be added and/or enhanced and variations can be made in user control of the processes without departing from certain embodiments consistent with the present invention. Such variations are contemplated and considered equivalent.

Those skilled in the art will also appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

While certain embodiments herein were described in conjunction with specific circuitry that carries out the functions described, other embodiments are contemplated in which the circuit functions are carried out using equivalent executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

While certain illustrative embodiments have been described, it is evident that many alternatives, modifications, permutations and variations will become apparent to those skilled in the art in light of the foregoing description.

What is claimed is:

1. A video display arrangement, comprising:

a video display panel;

a video source;

a sample and hold frame buffer receiving and storing frames of video information as the frames of video information are supplied from the video source at a refresh interval to the video display panel in a dynamic mode of operation wherein the screen is refreshed with a new frame of video data at each refresh interval, wherein the sample and hold frame buffer stores a most recent new frame of video at each refresh interval;

a switch that receives an output of the sample and hold frame buffer and the output of the video source, the switch being operative to divert the output of the sample and hold frame buffer to the display panel in place of the frames of video from the video source in a static mode of operation;

a high frame rate converter, where the sample and hold frame buffer receives frames of video data from the high frame rate converter and where the frames of data received from the sample and hold frame buffer by the video display panel comprise only un-synthesized frames, and where the sample and hold frame buffer is not configured to receive synthesized frames; and wherein the video source is placed in a lower power consumption mode in the static mode of operation.

2. The video display arrangement according to claim 1, wherein the video source is placed in a lower power consumption mode by removing supply power to the video source.

3. The video display arrangement according to claim 1, wherein the static mode of operation is entered in response to a user command.

4. The video display arrangement according to claim 1, wherein the static mode of operation is entered as a consequence of a user command to enter standby mode.

5. The video display arrangement according to claim 1, wherein the static mode is entered upon powering up the video display arrangement and wherein the switch switches to the dynamic mode after the video display arrangement is booted up.

6. The video display arrangement according to claim 1, wherein multiple frames are stored in the sample and hold frame buffer.

7. The video display arrangement according to claim 6, wherein the multiple frames are stored at specified time intervals.

8. The video display arrangement according to claim 6, wherein the multiple frames are stored in response to a snapshot trigger signal.

9. The video display arrangement according to claim 1, wherein the sample and hold frame buffer receives data representing a static image from a storage device that stores a static image.

10. A video display arrangement, comprising:

a video display panel;

a video source;

a static image storage device;

a sample and hold frame buffer receiving and storing multiple frames of video information as the frames of video information are supplied from the video source at a refresh interval to the video display panel in a dynamic mode of operation wherein the screen is refreshed with a new frame of video data at each refresh interval, and wherein the sample and hold frame buffer selectively receives data from the static image storage device, wherein the sample and hold frame buffer stores a most recent new frame of video at each refresh interval;

a switch that receives an output of the sample and hold frame buffer and the output of the video source, the switch being operative to divert the output of the sample and hold frame buffer to the display panel in place of the frames of video from the video source in a static mode of operation, wherein the static mode of operation is entered in response to a user command;

a high frame rate converter, where the sample and hold frame buffer receives frames of video data from the high frame rate converter and where the frames of data received by the sample and hold frame buffer comprise only un-synthesized frames, and where the sample and hold frame buffer is not configured to receive synthesized frames;

wherein the static mode is entered upon powering up the video display arrangement and wherein the switch switches to the dynamic mode after the video display arrangement is booted up;

wherein the sample and hold frame buffer selectively receives data representing a static image from the video source or from the static image storage device; and wherein the video source is placed in a lower power consumption mode in the static mode of operation.

11. The video display arrangement according to claim 10, wherein the video source is placed in a lower power consumption mode by removing supply power to the video source.

12. The video display arrangement according to claim 10, wherein the multiple frames are stored at specified time intervals.

13. A video display method, comprising:

sampling video from a video source using a sample and hold frame buffer such that frames are received and stored as the frames of video information are supplied from the video source at a refresh interval to a video display panel in a dynamic mode of operation wherein the screen is refreshed with a new frame of video data at each refresh interval;

a high frame rate converter, where the sample and hold frame buffer receives frames of video data from the high frame rate converter and where the frames of data received by the sample and hold frame buffer comprise only un-synthesized frames, and where the sample and hold frame buffer is not configured to receive synthesized frames;

determining that a static mode of operation is to be entered;

sending an output signal from the sample and hold frame buffer to the video display panel during the static mode of operation; and placing the video source in a lower power consumption mode in the static mode of operation.

14. The video method according to claim 13, wherein the video source is placed in a lower power consumption mode by removing supply power to the video source.

15. The video method according to claim 13, wherein the static mode of operation is entered in response to a user command.

16. The video method according to claim 13, wherein the static mode is entered upon powering up a video display system and wherein a switch switches to the dynamic mode of operation after the video display system is booted up.

17. The video method according to claim 13, wherein multiple frames are stored in the sample and hold frame buffer.

18. The video method according to claim 17, wherein the multiple frames are stored at specified time intervals.

19. The video method according to claim 13, wherein the sample and hold frame buffer receives data representing a static image from a storage device that stores a static image.

* * * * *